United States Patent
Jiang et al.

(10) Patent No.: US 11,578,172 B2
(45) Date of Patent: Feb. 14, 2023

(54) ANCHORAGE ADDITIVE AND METHODS FOR ITS PREPARATION AND USE

(71) Applicant: Dow Silicones Corporation, Midland, MI (US)

(72) Inventors: Jingui Jiang, Shanghai (CN); Zhihua Liu, Shanghai (CN); Jiayin Zhu, Shanghai (CN); Wenjie Chen, Shanghai (CN); Shenglan Zhang, Shanghai (CN)

(73) Assignee: Dow Silicones Corportation, Midland, MI (US)

( * ) Notice: Subject to any disclaimer, the term of this patent is extended or adjusted under 35 U.S.C. 154(b) by 199 days.

(21) Appl. No.: 17/050,870

(22) PCT Filed: Jun. 29, 2018

(86) PCT No.: PCT/CN2018/093727
§ 371 (c)(1),
(2) Date: Oct. 27, 2020

(87) PCT Pub. No.: WO2020/000387
PCT Pub. Date: Jan. 2, 2020

(65) Prior Publication Data
US 2021/0214506 A1    Jul. 15, 2021

(51) Int. Cl.
C08G 77/20 (2006.01)
C08G 77/12 (2006.01)
C08G 77/16 (2006.01)
C08G 77/18 (2006.01)
C09J 183/06 (2006.01)

(52) U.S. Cl.
CPC ............ *C08G 77/20* (2013.01); *C08G 77/12* (2013.01); *C08G 77/16* (2013.01); *C08G 77/18* (2013.01); *C09J 183/06* (2013.01)

(58) Field of Classification Search
CPC ........ C08G 77/12; C08G 77/20; C08G 77/18; C08G 77/16; C08L 83/00; C07F 7/1804; C07F 7/1896; C08K 5/5435; C09J 183/04
See application file for complete search history.

(56) References Cited

U.S. PATENT DOCUMENTS

| | | | |
|---|---|---|---|
| 2,676,182 A | 4/1954 | Daudt et al. | |
| 3,159,601 A | 12/1964 | Ashby | |
| 3,220,972 A | 11/1965 | Lamoreaux | |
| 3,296,291 A | 1/1967 | Chalk et al. | |
| 3,419,593 A | 12/1968 | Willing | |
| 3,516,946 A | 6/1970 | Modic | |
| 3,691,206 A | 9/1972 | Northrup | |
| 3,814,730 A | 6/1974 | Karstedt | |
| 3,989,668 A | 11/1976 | Lee et al. | |
| 4,374,967 A | 2/1983 | Brown et al. | |
| 4,584,355 A | 4/1986 | Blizzard et al. | |
| 4,585,836 A | 4/1986 | Homan et al. | |
| 4,591,622 A | 5/1986 | Blizzard et al. | |
| 4,611,042 A | 9/1986 | Rivers-Farrell et al. | |
| 4,766,176 A | 8/1988 | Lee et al. | |
| 4,774,310 A | 9/1988 | Butler | |
| 4,784,879 A | 11/1988 | Lee et al. | |
| 5,017,654 A | 5/1991 | Togashi et al. | |
| 5,036,117 A | 7/1991 | Chung et al. | |
| 5,175,325 A | 12/1992 | Brown et al. | |
| 5,270,110 A | 12/1993 | Murakami et al. | |
| 5,270,425 A * | 12/1993 | Vanwert | C08L 83/04 524/731 |
| 5,360,833 A | 11/1994 | Eckberg et al. | |
| 5,369,205 A | 11/1994 | Eckberg | |
| 5,466,532 A | 11/1995 | Wengrovius et al. | |
| 5,468,816 A | 11/1995 | Hurford et al. | |
| 5,468,828 A | 11/1995 | Hurford et al. | |
| 5,494,797 A | 2/1996 | McCann et al. | |
| 5,567,764 A | 10/1996 | Brasseur et al. | |
| 6,020,412 A | 2/2000 | Muschelewicz et al. | |
| 6,121,368 A | 9/2000 | Heying et al. | |
| 6,353,075 B1 | 3/2002 | Hupfield et al. | |
| 7,687,591 B2 | 3/2010 | Bhagwagar et al. | |
| 7,728,080 B2 | 6/2010 | Aoki | |
| 8,058,190 B2 | 11/2011 | Blackwood | |
| 8,093,339 B2 | 1/2012 | White et al. | |
| 8,580,073 B2 | 11/2013 | Behl | |
| 8,907,006 B1 * | 12/2014 | Rincon | C08G 77/20 428/404 |
| 9,562,149 B2 | 2/2017 | Cray | |
| 9,567,501 B2 | 2/2017 | Tsuchida | |
| 9,777,203 B2 | 10/2017 | Newsham et al. | |
| 10,023,767 B2 | 7/2018 | Huang et al. | |
| 10,479,913 B2 | 11/2019 | Han et al. | |
| 10,513,629 B2 | 12/2019 | Huang | |
| 10,774,217 B2 | 9/2020 | Bekemeier et al. | |
| 2003/0180468 A1 | 9/2003 | Cray et al. | |
| 2007/0289495 A1 | 12/2007 | Cray et al. | |
| 2011/0111217 A1 | 5/2011 | Kuroda et al. | |

(Continued)

FOREIGN PATENT DOCUMENTS

EP    0216376    4/1987
EP    0347895    12/1989
(Continued)

OTHER PUBLICATIONS

Japanese Office Action (with English translation) regarding application No. 2020-568538, dated Jul. 4, 2022.

*Primary Examiner* — Kuo Liang Peng

(74) *Attorney, Agent, or Firm* — Catherine U. Brown

(57) ABSTRACT

A pressure sensitive adhesive composition includes (A) 0.1% to 5% an anchorage additive and (B) 95% to 99.9% of a silicone pressure sensitive adhesive composition. This pressure sensitive adhesive composition can be cured to form a pressure sensitive adhesive. When cured on a backing substrate, the resulting adhesive article is useful for protecting electronic devices during fabrication, shipping, and use.

19 Claims, 1 Drawing Sheet

(56) References Cited

U.S. PATENT DOCUMENTS

| | | |
|---|---|---|
| 2012/0045634 A1 | 2/2012 | Irie et al. |
| 2012/0328863 A1 | 12/2012 | Kuo |
| 2015/0119518 A1 | 4/2015 | Ihara |
| 2016/0053056 A1 | 2/2016 | Gould et al. |
| 2016/0053148 A1 | 2/2016 | Tsuchida |
| 2016/0376475 A1 | 12/2016 | Huang et al. |
| 2016/0376482 A1 | 12/2016 | Morgeneyer et al. |
| 2017/0233612 A1 | 8/2017 | Han et al. |
| 2020/0071578 A1 | 3/2020 | Huo et al. |

FOREIGN PATENT DOCUMENTS

| | | |
|---|---|---|
| FR | 2719598 | 11/1995 |
| WO | 2012094775 | 7/2012 |
| WO | 2013123619 | 8/2013 |
| WO | 2019049365 | 3/2019 |
| WO | 2019079366 | 4/2019 |
| WO | 2020000389 | 1/2020 |

\* cited by examiner

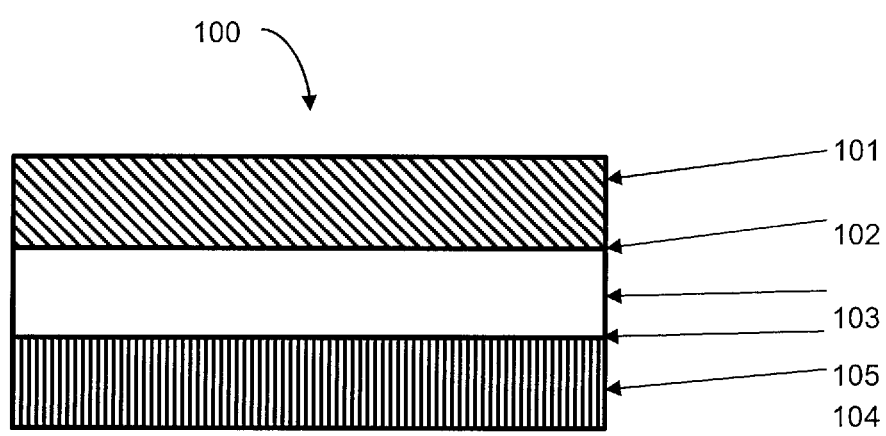

ANCHORAGE ADDITIVE AND METHODS FOR ITS PREPARATION AND USE

CROSS REFERENCE

This application is a U.S. national stage filing under 35 U.S.C. § 371 of PCT Application No. PCT/CN18/093727 filed on 29 Jun. 2018, currently pending. PCT Application No. PCT/CN18/093727 is hereby incorporated by reference.

TECHNICAL FIELD

This invention relates to an anchorage additive, a method for its preparation, and a pressure sensitive adhesive composition containing the additive. A pressure sensitive adhesive laminate article prepared by curing this composition on a substrate is useful in electronics applications for protection and/or masking during processing.

BACKGROUND

Protective films and carrier tapes are two major applications in the electronics fabrication industry for silicone pressure sensitive adhesives. Usually the thickness of pressure sensitive adhesives (PSAs) in protective films and carrier tapes is relatively thinner than traditional tape applications. Commercially available PSAs for these applications are predominantly solvent based.

Non-uniform adhesive coverage on substrates may suffer from the drawback of having too high adhesion for protective films in which the PSAs may cause damage to protected substrates when the protective film removed. Moreover, the uneven adhesive surface may suffer from the drawback of having unstable adhesion for carrier tapes during processing protection, in which may cause surface damage or quality issues in surface protection and/or process masking when the carrier tape is removed.

Problem to be Solved

There is a need in the electronics fabrication industry for pressure sensitive adhesives that have one or more of the following properties: low haze, good rub off resistance, good adhesion at room temperature, and adhesion stability after aging.

SUMMARY

A process for making an anchorage additive comprises: 1) combining, at a temperature of −20° C. to 160° C., starting materials (A) and (B), where Starting material (A) is 33% to 67% of a silane composition comprising (A-1) an unsaturated silane of formula $R^1SiR^2_3$, where $R^1$ is a monovalent hydrocarbon group with terminal aliphatic unsaturation, each $R^2$ is an independently selected hydrocarbonoxy or acyloxy group;

(A-2) a trialkoxysilane having an anchorage promoting-group, where the trialkoxysilane has formula $R^3Si(OR^4)_3$, where each $R^3$ comprises an anchorage promoting-group selected from the group consisting of an epoxy-functional group, an acyloxy-functional group, and an acrylate-functional group, and each $R^4$ is an independently selected alkyl group of 1 to 6 carbon atoms;

with the proviso that (A-1) and (A-2) are present in amounts such that a weight ratio of (A-1)/(A-2) has a value of 0.4/1 to 2.5/1; and starting material (B) is 33% to 67% of a polydiorganosiloxane having unit formula: $(R^7R^5_cR^6_{(2-c)}SiO_{1/2})_2(R^5_2SiO_{2/2})_a(R^5R^6SiO_{2/2})_b$, where each $R^7$ is independently selected from the group consisting of OH and $OR^4$, each $R^5$ is independently selected from the group consisting of monovalent hydrocarbon groups free of terminal aliphatic unsaturation and monovalent halogenated hydrocarbyl groups free of terminal aliphatic unsaturation, each $R^6$ is an independently selected monovalent hydrocarbon group with terminal aliphatic unsaturation, subscript a≥0, subscript b≥0, and subscript c has a value such that 2≥c≥1, where combined amounts of starting materials (A) and (B) add up to 100%. The anchorage additive is prepared as a reaction product of this process.

A pressure sensitive adhesive composition comprises: 0.1% to 5% of the anchorage additive described above and 95% to 99.9% of a silicone pressure sensitive adhesive composition.

The pressure sensitive adhesive composition may be used to prepare an adhesive article in a method comprising: 1) coating the pressure sensitive adhesive composition on a surface of a backing substrate, and 2) curing the composition to form a pressure sensitive adhesive on the surface of the backing substrate.

The adhesive article prepared as described above may be adhered to an electronic device such that the pressure sensitive adhesive is between the backing substrate and a surface of the device. The adhesive article may protect the electronic device during fabrication, shipping, and/or use.

BRIEF DESCRIPTION OF THE DRAWINGS

FIG. 1 shows a partial cross section of an adhesive article 100. The adhesive article comprises a pressure sensitive adhesive 101 prepared by curing a pressure sensitive adhesive composition described herein on a first surface 102 of a film substrate 103. The article 100 further includes a second substrate 104 mounted to an opposing surface 105 of the film substrate 103.

DETAILED DESCRIPTION OF THE INVENTION

This invention provides an anchorage additive. The anchorage additive is particularly well suited for curable compositions, e.g., those which are hydrosilylation-reaction curable. The anchorage additive and a curable composition including the anchorage additive have excellent physical properties and are well suited for diverse end use applications. The curable composition including the anchorage additive forms films having desirable properties, including adhesive properties. For example, the curable composition including the anchorage additive may form films having low haze, good rub off resistance, good adhesion at room temperature, and adhesion stability after aging. The anchorage additive, the curable composition, and related processes are described in greater detail below.

The anchorage additive may be prepared by a process comprising: 1) combining, at a temperature of −20° C. to 160° C., starting materials (A) and (B), where starting material (A) is 33% to 67% of a silane composition comprising (A-1) an unsaturated silane of formula $R^1SiR^2_3$, where $R^1$ is a monovalent hydrocarbon group with terminal aliphatic unsaturation, each $R^2$ is an independently selected hydrocarbonoxy or acyloxy group;

(A-2) a trialkoxysilane having an anchorage promoting-group, where the trialkoxysilane has formula $R^3Si(OR^4)_3$, where each $R^3$ comprises an anchorage promoting-group selected from the group consisting of an epoxy-functional group, an acyloxy-functional group, and an acrylate-functional group, and each $R^4$ is an independently selected alkyl group of 1 to 6 carbon atoms;

with the proviso that (A-1) and (A-2) are present in amounts such that a ratio of (A-1)/(A-2) has a value of 0.4/1 to 2.5/1; and starting material (B) is 33% to 67% of a polydiorganosiloxane composition having unit formula: $(R^7R^5_cR^6_{(2-c)}SiO_{1/2})_2(R^5_2SiO_{2/2})_a(R^5R^6SiO_{2/2})_b$, where each $R^7$ is independently selected from the group consisting of OH and $OR^4$, each $R^5$ is independently selected from the group consisting of monovalent hydrocarbon groups free of terminal aliphatic unsaturation and monovalent halogenated hydrocarbyl groups free of terminal aliphatic unsaturation, each $R^6$ is an independently selected monovalent hydrocarbon group with terminal aliphatic unsaturation, subscript a≥0, subscript b≥0, and subscript c has a value such that 2≥c≥1, where combined amounts of starting materials (A) and (B) add up to 100%.

Starting material (A-1) is a silane having an aliphatically unsaturated monovalent hydrocarbon group. Starting material (A-1) is an unsaturated silane of formula $R^1SiR^2_3$, where $R^1$ is a monovalent hydrocarbon group with aliphatic unsaturation, each $R^2$ is an independently selected hydrocarbonoxy or acyloxy group. $R^1$ is exemplified by alkenyl and alkynyl groups, as defined below. Various examples of $R^1$ include: $CH_2=CH-$, $CH_2=CHCH_2-$, $CH_2=CH(CH_2)_4-$, $CH_2=C(CH_3)CH_2-H_2C=C(CH_3)-$, $H_2C=C(CH_3)-$, $H_2C=C(CH_3)CH_2-H_2C=CHCH_2CH_2-$, $H_2C=CHCH_2CH_2CH_2-$, HC≡C, HC≡CCH$_2-$, HC≡CCH(CH$_3$)$-$, HC≡CC(CH$_3$)$_2-$, and HC≡CC(CH$_3$)$_2$CH$_2-$. Alternatively, each $R^1$ may be an alkenyl group such as vinyl, allyl, hexenyl, or undecylenyl. Alternatively, each $R^1$ may be selected from the group consisting of vinyl, allyl, and hexenyl. Alternatively, each $R^1$ may be vinyl. Each $R^2$ is an independently selected hydrocarbonoxy or acyloxy group. Alternatively, $R^2$ may be a hydrocarbonoxy group such as an alkoxy group, exemplified by methoxy, ethoxy, propoxy, and butoxy. Alternatively $R^2$ may be an acyloxy group such as acetoxy.

Alternatively, the unsaturated silane may be a hydrocarbonoxysilane, such as an alkenyl-functional alkoxysilane. Examples of alkenyl-functional alkoxysilanes suitable for starting material (A-1) include vinyltrimethoxysilane, vinyltriethoxysilane, allyltrimethoxysilane, allyltriethoxysilane, hexenyltrimethoxysilane, hexenyltriethoxysilane, undecylenyltrimethoxysilane, undecylenyltriethoxysilane, and combinations of two or more thereof. Alternatively, starting material (A-1) may be vinyltrimethoxysilane. Alternatively, starting material (A-1) may be an alkenyl-functional acyloxysilane, such as an alkenyl-functional acetoxysilane. Suitable alkenyl-functional acetoxysilanes for starting material (A-1) include vinyltriacetoxysilane, allyltriacetoxysilane, hexenyltriacetoxysilane, and combinations of two or more thereof. Alternatively, starting material (A-1) may be vinyltriacetoxysilane.

Starting material (A-2) is a trialkoxysilane having an anchorage promoting group, $R^3$. The anchorage promoting group for $R^3$ may be selected from the group consisting of an epoxy-functional group, an acyloxy-functional group, and an acrylate-functional group. Alternatively, $R^3$ may be selected from the group consisting of an epoxy-functional group and an acrylate-functional group. Alternatively, each $R^3$ may be an epoxy-functional group. Each $R^4$ is an independently selected alkyl group of 1 to 6 carbon atoms, alternatively 1 to 4 carbon atoms, and alternatively 1 to 2 carbon atoms. Alternatively, each $R^4$ is methyl. Alternatively, each $R^4$ is ethyl. Suitable epoxy-functional groups are exemplified by epoxy alkyl groups such as 3-glycidoxypropyl and (epoxycyclohexyl)ethyl. Suitable acrylate-functional groups are exemplified by (meth)acryloyloxyalkyl such as 3-methacryloyloxypropyl and 3-acryloyloxypropyl. Suitable epoxy-functional trialkoxysilanes for starting material (A-2) include 3-glycidoxypropyltrimethoxysilane, 3-glycidoxypropyltriethoxysilane, (epoxycyclohexyl)ethyldimethoxysilane, (epoxycyclohexyl)ethyldiethoxysilane, and combinations of two or more thereof. Examples of suitable acrylate-functional trialkoxysilanes include 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations of two or more thereof. Alternatively, starting material (A-2) may be 3-glycidoxypropyltrimethoxysilane.

Starting materials (A-1) and (A-2) are present in amounts such that a weight ratio of (A-1)/(A-2) has a value of 0.4/1 to 2.5/1. Alternatively, the weight ratio of (A-1)/(A-2) may be 0.4/1 to 2.3/1; alternatively 0.4/1 to 1/1; and 1/1 to 2.3/1; and alternatively 1/1.

The method may optionally further comprise: combining starting materials (A-1) and (A-2), and thereafter adding starting material (B) in step 1). The combination of starting materials (A-1) and (A-2) may be a physical mixture, a reaction product, or a combination thereof. For example, when starting material (A-1) has alkoxy groups, the combination of (A-1) and (A-2) may include rearrangement reaction products wherein one silane molecule has both an alkoxy group and an acetoxy group. Starting materials (A-1) and (A-2) may be combined at a temperature of −20° C. to 160° C., alternatively >50° C. to 140° C.

Starting material (A) is used in an amount of 33% to 67% based on combined weights of starting materials (A) and (B). Alternatively, starting material (A) may be used in an amount of 40% to 65%, alternatively 45% to 60%, and alternatively 50% to 56%, based on combined weights of starting materials (A) and (B). Starting materials (A) and (B) may be combined at a temperature of −20° C. to 160° C. Alternatively, in certain embodiments, such as when silanes (A-1) and (A-2) are combined at a temperature >50° C. to 140° C., the method may further comprise cooling starting material (A) before combining starting materials (A) and (B). Alternatively, starting materials (A) and (B) may be combined at a temperature of −20° C. to 50° C., alternatively, 0° C. to 50° C., and alternatively 40° C. to 50° C.

Starting material (B) comprises a polydiorganosiloxane having unit formula (B-1): $(R^7R^5_cR^6_{(2-c)}SiO_{1/2})_2(R^5_2SiO_{2/2})_a(R^5R^6SiO_{2/2})_b$, where each $R^7$ is independently selected from the group consisting of OH and $OR^4$, where $R^4$ is as described above; each $R^5$ is independently selected from the group consisting of monovalent hydrocarbon groups free of aliphatic unsaturation and monovalent halogenated hydrocarbon groups free of aliphatic unsaturation; each $R^6$ is an independently selected monovalent hydrocarbon group with aliphatic unsaturation; subscript a≥1; and subscript b≥0; and subscript c has a value such that 2≥c≥1. In this formula, each $R^5$ may be a monovalent hydrocarbon group free of aliphatic unsaturation or a monovalent halogenated hydrocarbon group free of aliphatic unsaturation. Alternatively, $R^5$ may be an alkyl group, an aryl group, or a cycloalkyl group as defined hereinbelow. The alkyl group for $R^5$ may be, for example, methyl, ethyl, propyl, butyl or hexyl (including branched and linear isomers of each). Alternatively, $R^5$ may be alkyl and aryl, such as methyl and phenyl. Each $R^6$ may be alkenyl or alkynyl, as described below. Various examples of $R^6$ include: $CH_2$=CH—, $CH_2$=CHCH$_2$—, $CH_2$=CH(CH$_2$)$_4$—, $CH_2$=C(CH$_3$) $CH_2$—H$_2$C=C(CH$_3$)—, H$_2$C=C(CH$_3$)—, H$_2$C=C(CH$_3$) $CH_2$—H$_2$C=CHCH$_2$CH$_2$—, H$_2$C=CHCH$_2$CH$_2$CH$_2$—, HC≡C—, HC≡CCH$_2$—, HC≡CCH(CH$_3$)—, HC≡CC(CH$_3$)$_2$—, and HC≡CC(CH$_3$)$_2$CH$_2$—. Alternatively, each $R^6$ may be alkenyl, such as vinyl, allyl or hexenyl; alternatively vinyl. Each $R^7$ may be a hydroxyl or an alkoxy group, such as methoxy.

In unit formula (B-1), subscripts a, b, and c, may have values such that 12≥a≥1, 12≥b≥0, and 2≥c≥1. A quantity (b+c) has an average value greater than 0.

Starting material (B) includes a polydiorganosiloxane with both a hydrolyzable group and a monovalent hydrocarbon group with aliphatic unsaturation, which is exemplified by α,ω-hydroxy,dimethylsiloxy-terminated polymethylvinylsiloxane; α,ω-hydroxy,dimethylsiloxy-terminated poly(dimethylsiloxane/methyvinylsiloxane); α,ω-hydroxy,methyl,vinylsiloxy-terminated polydimethylsiloxane; α,ω-hydroxy,methyl,vinylsiloxy-terminated poly(dimethylsiloxane/methylvinyisiloxane); α,ω-hydroxy,methyl,vinylsiloxy-terminated polymethylvinylsiloxane; α,ω-hydroxy,dimethylsiloxy-terminated polymethylhexenylsiloxane; α,ω-hydroxy,dimethylsiloxy-terminated poly(dimethylsiloxane/methyhexenylsiloxane); α,ω-hydroxy,methyl,hexenylsiloxy-terminated polydimethylsiloxane; α,ω-hydroxy,methyl,hexenylsiloxy-terminated poly(dimethylsiloxane/methylhexenylsiloxane); α,ω-hydroxy,methyl,hexenylsiloxy-terminated polymethylhexenylsiloxane; α-hydroxy,dimethylsiloxy-terminated, ω-methoxy,dimethylsiloxy-terminated polymethylvinylsiloxane; α-hydroxy,dimethylsiloxy-terminated, ω-methoxy, dimethylsiloxy-terminated poly(dimethylsiloxane/methyvinylsiloxane); α-hydroxy,methyl,vinylsiloxy-terminated, ω-methoxy,methyl,vinylsiloxy-terminated polydimethylsiloxane; α-hydroxy,methyl,vinylsiloxy-terminated, ω-methoxy,methyl,vinylsiloxy-terminated poly(dimethylsiloxane/methylvinylsiloxane); α-hydroxy,methyl,vinylsiloxy-terminated, ω-methoxy,methyl,vinylsiloxy-terminated polymethylvinylsiloxane; α-hydroxy,dimethylsiloxy-terminated, ω-methoxy,dimethylsiloxy-terminated polymethylhexenylsiloxane; α-hydroxy,dimethylsiloxy-terminated, ω-methoxy,dimethylsiloxy-terminated poly(dimethylsiloxane/methyhexenylsiloxane); α-hydroxy,methyl,hexenylsiloxy-terminated α,ω-methoxy,methyl,hexenylsiloxy-terminated polydimethylsiloxane; α-hydroxy,methyl, hexenylsiloxy-terminated α,ω-methoxy,methyl, hexenylsiloxy-terminated poly(dimethylsiloxane/ methylhexenylsiloxane); α-hydroxy,methyl,hexenylsiloxy-terminated α,ω-methoxy,methyl, hexenylsiloxy-terminated polymethylhexenylsiloxane; α,ω-methoxy,dimethylsiloxy-terminated polymethylvinylsiloxane; α,ω-methoxy,dimethylsiloxy-terminated poly(dimethylsiloxane/methyvinylsiloxane); α,ω-methoxy,methyl,vinylsiloxy-terminated polydimethylsiloxane; α,ω-methoxy,methyl,vinylsiloxy-terminated poly(dimethylsiloxane/methylvinylsiloxane); α,ω-methoxy,methyl,vinylsiloxy-terminated polymethylvinylsiloxane; α,ω-methoxy,dimethylsiloxy-terminated polymethylhexenylsiloxane; α,ω-methoxy,dimethylsiloxy-terminated poly(dimethylsiloxane/methyhexenylsiloxane); and combinations of two or more thereof. Alternatively, starting material (B) may comprise α,ω-hydroxy,dimethylsiloxy-terminated poly(dimethylsiloxane/methyvinylsiloxane) and α-hydroxy,dimethylsiloxy-terminated, ω-methoxy,dimethylsiloxy-terminated poly(dimethylsiloxane/methyvinylsiloxane); and a combination of two or more thereof.

Starting material (B) may optionally further comprise a polydiorganosiloxane having hydrolyzable groups, which is free of aliphatic unsaturation. Up to 20%, alternatively 5% to 20%, and alternatively 10% to 15% of starting material (B) may be the polydiorganosiloxane having hydrolyzable groups, which is free of aliphatic unsaturation. This polydiorganosiloxane may have unit formula (B-2): $(R^7R^5_2 SiO_{1/2})_2(R^5_2SiO_{2/2})_d$, where $R^5$ and $R^7$ are as described above, and subscript d 1. Starting material (B) may comprise 0 to 20%, alternatively 5 to 15% of this additional polydiorganosiloxane. Examples of this additional polydiorganosiloxane include α,ω-hydroxy,dimethylsiloxy-terminated polydimethylsiloxane; α,ω-methoxy,dimethylsiloxy-terminated polydimethylsiloxane; α-hydroxy,dimethylsiloxy-terminated ω-methoxy,dimethylsiloxy-terminated polydimethylsiloxane; and combinations of two or more thereof.

Starting material (B) is used in an amount of 33% to 67% based on combined weights of starting materials (A) and (B). Alternatively, starting material (B) may be used in an amount of 35% to 55%, alternatively 45% to 50%, based on combined weights of starting materials (A) and (B). The process for making the anchorage additive may be performed under inert conditions, i.e., the equipment, such as a reactor, in which the anchorage additive will be made may be purged with an inert gas such as nitrogen before introducing starting materials (A-1), (A-2) and (B). The equipment may be dried, e.g., by heating before introducing starting materials (A-1), (A-2) and (B). The process may optionally further comprise one or more additional steps. The anchorage additive may be filtered to remove by-products after step (1).

The present invention also provides a curable composition. The curable composition comprises (I) the anchorage additive described above. The curable composition further comprises (II) a hydrosilylation curable composition. The curable composition may comprise 0.1% to 5% of (I) the anchorage additive and 95% to 99.9% of (II) the hydrosilylation curable composition.

The hydrosilylation curable composition may comprise:

(a) a polydiorganosiloxane having an average, per molecule, of at least two aliphatically unsaturated hydrocarbon groups, (b) a polyorganohydrogensiloxane having an average, per molecule, of at least two silicon bonded hydrogen atoms per molecule; and (c) a hydrosilylation reaction catalyst in an amount sufficient to provide 1 to 1000 ppm of platinum group metal based on combined weights of all starting materials in the curable composition. In addition to starting materials (a), (b), and (c), above, the hydrosilylation curable composition may further comprise one or more additional starting materials selected from the group consisting of: (d) a polysiloxane resin, (e) a branched polyorganosiloxane, (f) a solvent, (g) a reactive diluent, and (h) a hydrosilylation reaction inhibitor. When the hydrosilylation curable composition is a pressure sensitive adhesive composition, starting material (d), starting material (e), or both (d) and (e), is typically present. Silicone pressure sensitive adhesives are known in the art. For example, the anchorage additive described above may be used in the silicone pressure sensitive adhesive in U.S. Pat. No. 6,121,368, which is hereby incorporated by reference, or PCT Publication WO2013/123619 in addition, or instead of, any anchorage additive that may be recited therein.

(a) Polydiorganosiloxane with Aliphatic Unsaturation

Starting material (a) in the pressure sensitive adhesive composition described herein is a polydiorganosiloxane having a monovalent hydrocarbon group with terminal aliphatic unsaturation. Starting material (a) comprises formula (a-1): $(R^8_2R^9SiO_{1/2})_2(R^8_2SiO_{2/2})_e(R^8R^9SiO_{2/2})_f$, where each $R^8$ is independently selected from the group consisting of a monovalent hydrocarbon group free of terminal aliphatic unsaturation and a monovalent halogenated hydrocarbon group free of terminal aliphatic unsaturation, each $R^9$ is an independently selected monovalent hydrocarbon group with aliphatic unsaturation, and subscript e has an average value of 150 to 15,000, and subscript f has an average value of 0 to 100. Suitable monovalent hydrocarbon groups and monovalent halogenated hydrocarbon groups for $R^8$ are as defined below. Alternatively, each $R^8$ may be an alkyl group, a cycloalkyl group, an aryl group or an aralkyl group. Alternatively, each $R^8$ may be an alkyl group or an aryl group. Alternatively, each $R^8$ may be methyl or phenyl. Each $R^9$ may be an alkenyl group or an alkynyl group as defined below. Alternatively, each $R^9$ may be an alkenyl group selected from vinyl, allyl, and hexenyl. Alternatively, subscript e may be 150 to 1,000. Alternatively, subscript e may have a value sufficient to impart a viscosity of 400 mPa·s to 100,000 mPa·s to the polydiorganosiloxane for starting material (a). Viscosity is measured according to technique described in the Reference Examples herein below. Alternatively, subscript e may have a value sufficient to impart viscosity of 450 mPa·s to <100,000 mPa·s, and alternatively 450 mPa·s to 35,000 mPa·s to starting material (a). Alternatively, starting material (a) may have formula (a-2): $(R^8_2R^9SiO)$—$(R^8_2SiO)_f$—$(OSiR^8_2R^9)$, where subscript f has an average value of 150 to 2,000, and $R^8$ and $R^9$ are as described above.

Starting material (a) may comprise a polydiorganosiloxane such as a-3) α,ω-dimethylvinylsiloxy-terminated polydimethylsiloxane, a-4) α,ω-dimethylvinylsiloxy-terminated poly(dimethylsiloxane/methylphenylsiloxane), a-5) α,ω-dimethylvinylsiloxy-terminated poly(dimethylsiloxane/diphenylsiloxane), a-6) α,ω-phenyl,methyl,vinyl-siloxy-terminated polydimethylsiloxane, a-7) α,ω-dimethylhexenylsiloxy-terminated polydimethylsiloxane, a-8) a combination of two or more of a-3), a-4), a-5), a-6), and a-7). Methods of preparing polydiorganosiloxanes suitable for use as starting material (a), such as hydrolysis and condensation of the corresponding organohalosilanes or equilibration of cyclic polydiorganosiloxanes, are well known in the art.

The amount of starting material (a) depends on various factors including the type and amount of other starting materials in the pressure sensitive adhesive composition, the concentration of aliphatically unsaturated groups and silicon bonded hydrogen atoms of the starting materials in the composition, whether a solvent or a reactive diluent is present, and whether an inhibitor is present. However, the amount of starting material (a) may be 10% to 98%, alternatively 40% to 90%, alternatively 10% to 60%, based on combined weights of all starting materials in the silicone pressure sensitive adhesive composition.

(b) Polyorganohydrogensiloxane

Starting material (b) is a polyorganohydrogensiloxane. Starting material (b) acts as a crosslinker in the pressure sensitive adhesive composition. Starting material (b) may have at least 2, alternatively least 3, silicon bonded hydrogen atoms per molecule.

Starting material (b) may comprise a polyorganohydrogensiloxane of unit formula (b-1) $(R^8_3SiO_{1/2})_p(R^8_2SiO_{2/2})_q(R^8SiO_{3/2})_r(SiO_{4/2})_s((R^8SiO_{2/2})_t(R^8_2HSiO_{2/2})_t(R^8_2HSiO_{1/2})_u$, where $R^8$ is as described above, and subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100, alternatively 10 to 60. Alternatively, starting material (b) may comprise a polyorganohydrogensiloxane of unit formula (b-2): $(R^8_3SiO_{1/2})_2(R^8_2SiO_{2/2})_{aa}(R^8HSiO_{2/2})_{bb}$, where each $R^8$ is selected from the group consisting of methyl and phenyl, subscript aa is 0 to 30, and subscript bb is 5 to 50.

Alternatively, starting material (b) may comprise a polyorganohydrogensiloxane of Formula (b-3): $R^8_3SiO(R^8_2SiO)_g(R^8HSiO)_hSiR^8_3$, Formula (b-4): $R^8_2HSiO(R^8_2SiO)_i(R^8HSiO)_jSiR^8_2H$, or both (b-3) and (b-4). In formulae (b-3) and (b-4), $R^8$ is as described above. Subscript g has an average value of 0 to 2000, subscript h has an average value of 2 to 2000, subscript i has an average value of 0 to 2000, and subscript j has an average value of 0 to 2000.

Polyorganohydrogensiloxanes for starting material (b) are exemplified by: (b-5) α,ω-dimethylhydrogensiloxy-terminated polydimethylsiloxane, (b-6) α,ω-dimethylhydrogensiloxy-terminated poly(dimethylsiloxane/methylhydrogensiloxane), (b-7) α,ω-dimethylhydrogensiloxy-terminated polymethylhydrogensiloxane, (b-8) α,ω-trimethylsiloxy-terminated poly(dimethylsiloxane/methylhydrogensiloxane), (b-9) α,ω-trimethylsiloxy-terminated polymethylhydrogensiloxane, (b-10) α,ω-trimethylsiloxy-terminated poly(dimethylsiloxane/methylphenylsiloxane/methylhydrogensiloxane), (b-11) α,ω-trimethylsiloxy terminated dimethylhydrogensiloxy-terminated poly(methylphenylsiloxane/dimethylsiloxane), (b-12) α,ω-dimethylhydrogensiloxy-terminated polymethylphenylsiloxane, and (b-13) a combination of two or more of (b-5), (b-6), (b-7), (b-8), (b-9), (b-10), (b-11), and (b-12).

Methods of preparing organohydrogenpolysiloxanes, such as hydrolysis and condensation of organohalosilanes, are well known in the art.

The amount of starting material (b) depends on various factors including the concentration of aliphatically unsaturated monovalent hydrocarbon groups in the composition and the SiH content of starting material (b), and whether a solvent or reactive diluent is present. However, the amount of starting material (b) may be 0.01% to 10%, alternatively 3% to 8%, and alternatively 0.01 to 5%, based on combined weights of all starting materials in the silicone pressure sensitive adhesive composition. However, the amount of starting material (b) may be sufficient to provide a total mole ratio of silicone bonded hydrogen to aliphatically unsaturated groups of the other starting materials in the composition (overall SiH/Vi ratio) of 0.5/1 to 50/1, alternatively 1/1 to 20/1.

(c) Hydrosilylation Reaction Catalyst

Starting material (c) in the pressure sensitive adhesive composition is a hydrosilylation reaction catalyst. Hydrosilylation reaction catalysts are known in the art and are commercially available. Hydrosilylation reaction catalysts include platinum group metal catalysts. The hydrosilylation reaction catalyst can be a metal selected from platinum, rhodium, ruthenium, palladium, osmium, and iridium. Alternatively, the hydrosilylation catalyst may be a compound of such a metal, for example, chloridotris(triphenylphosphane) rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation catalysts and methods of preparing them are known in the art, as exemplified in U.S. Pat. Nos. 4,766,176 and 5,017,654.

The amount of catalyst used herein will depend on various factors including the selection of other starting materials and their respective contents of silicon bonded hydrogen atoms and terminally aliphatically unsaturated groups, whether a solvent or reactive diluent is present, and whether an inhibitor is present, however, the amount of catalyst is sufficient to catalyze hydrosilylation reaction of SiH and aliphatically unsaturated groups, alternatively the amount of catalyst is sufficient to provide 1 ppm to 1000 ppm of the platinum group metal, alternatively 5 ppm to 200 ppm, alternatively 50 to 150 ppm, and alternatively 5 ppm to 100 ppm, based on combined weights of all starting materials in the pressure sensitive adhesive composition.

The silicone pressure sensitive adhesive composition may further comprise one or more additional starting materials selected from the group consisting of: (d) a polysiloxane resin, (e) a branched polyorganosiloxane, (f) a solvent, (g) a reactive diluent, and (h) a hydrosilylation reaction inhibitor.
(d) Polysiloxane Resin The polysiloxane resin suitable for starting material (d) comprises a polyorganosilicate resin, which comprises monofunctional units ("M" units) of formula $R^M_3SiO_{1/2}$ and tetrafunctional silicate units ("Q" units) of formula $SiO_{4/2}$, where each $R^M$ is an independently selected monovalent organic group, which may be a monovalent hydrocarbon group or a monovalent halogenated hydrocarbon group as described herein. Alternatively, in the polyorganosilicate resin, each $R^M$ may be independently selected from the group consisting of $R^8$ and $R^9$ as described herein. Alternatively, each $R^M$ may be selected from the group consisting of alkyl, alkenyl and aryl. Alternatively, each $R^M$ may be selected from methyl, vinyl and phenyl. Alternatively, at least one-third, alternatively at least two thirds of the $R^M$ groups are methyl groups. Alternatively, the M units may be exemplified by $(Me_3SiO_{1/2})$, $(Me_2PhSiO_{1/2})$, and $(Me_2ViSiO_{1/2})$. The polyorganosilicate resin is soluble in solvents such as those described above, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula $Si(O-SiR^M_3)_4$, where $R^M$ is as described above, e.g., the neopentamer may be tetrakis(trimethylsiloxy)silane. $^{29}Si$ NMR spectroscopy may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin may be greater than 3,000 Da, alternatively >3,000 to 8,000 Da. Alternatively, Mn of the polyorganosilicate resin may be 3,500 to 8,000 Da.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use in the pressure sensitive adhesive composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent such as halogen, alkoxy, acyloxy, hydroxyl, oximo, or ketoximo; alternatively, halogen, alkoxy or hydroxyl. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above typically contain silicon bonded hydroxyl groups, i.e., of formulae, $HOSi_{3/2}$ and/or $HORM_2SiO_{1/2}$. The polyorganosilicate resin may comprise up to 2% of silicon bonded hydroxyl groups, as measured by FTIR spectroscopy. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

In one embodiment, the polyorganosilicate resin may further comprises 2% or less, alternatively 0.7% or less, and alternatively 0.3% or less, and alternatively 0.3% to 0.8% of units represented by formula $XSiO_{3/2}$ and/or $XR^M_2SiO_{1/2}$ where $R^M$ is as described above, and X represents a hydrolyzable substituent, as described above for $X^1$. The concentration of silanol groups present in the polyorganosiloxane may be determined using FTIR spectroscopy.

Alternatively, the polyorganosilicate resin may have terminal aliphatically unsaturated groups. The polyorganosilicate resin having terminal aliphatically unsaturated groups may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584, 355; 4,591,622; and 4,585,836. A single endblocking agent or a mixture of such agents may be used to prepare such resin.

Alternatively, the polyorganosilicate resin for starting material (d) may comprise unit formula (d-1): $(R^8_3SiO_{1/2})_m(R^8_2R^9SiO_{1/2})_n(SiO_{4/2})_o$, where $R^8$ and $R^9$ are as described above and subscripts m, n and o have average values such that m 0, n 0, o>1, and (m+n)>4. Alternatively, starting material (d) comprises unit formula (d-2): $(R^8_3SiO_{1/2})_z(SiO_{4/2})_o$, where each $R^8$ is independently selected from the group consisting of methyl and phenyl, subscript o is as described above, and subscript z>4.

The exact amount of starting material (d) depends on various factors including the type and amount of starting material (a), the type and amount of starting material (b), the concentration of aliphatically unsaturated groups and silicon bonded hydrogen atoms of the starting materials in the composition, whether a solvent or reactive diluent is present, and whether an inhibitor is present. However, starting materials (a) (and when present (e)) and (d) are present in amounts sufficient to provide a molar ratio of amount of starting material (d) to combined amounts of starting materials (a) and (e) (resin/polymer, or d/(a+e) ratio) of 0.05/1 to 1.5/1; alternatively 0.6/1 to 0.9/1, and alternatively 0.7/1 to 0.8/1. Alternatively, starting material (d) may be present in an amount of 10% to 60%, alternatively 12% to 51%, alternatively 25% to 40%, based on combined weights of all starting materials in the silicone pressure sensitive adhesive composition.

(e) Branched Polyorganosiloxane

Starting material (e) in the silicone pressure sensitive adhesive composition described herein is a branched polyorganosiloxane. Starting material (e) may comprise a Q branched polyorganosiloxane of unit formula (e-1) $(R^8_3SiO_{1/2})_{cc}(R^8_2R9SiO_{1/2})_{dd}(R^8_2SiO_{2/2})_{ee}(SiO_{4/2})_{ff}$, where $R^8$ and $R^9$ are as described above for starting material (a), and subscripts g, h, i, and j have average values such that $2≥cc≥0$, $4≥dd≥0$, $995≥ee≥4$, $ff=1$, a quantity (cc+dd)=4, and a quantity (cc+dd+ee+ff) has a value sufficient to impart a viscosity >170 mPa·s measured by rotational viscometry (as described below in the Reference Examples) to the branched polyorganosiloxane. Alternatively, viscosity may be >170 mPa·s to 1000 mPa·s, alternatively >170 to 500 mPa·s, alternatively 180 mPa·s to 450 mPa·s, and alternatively 190 mPa·s to 420 mPa·s. Suitable branched siloxanes for starting material (e-1) are exemplified by those disclosed in U.S. Pat. No. 6,806,339 and U.S. Patent Publication 2007/0289495.

Alternatively, starting material (e) may comprise formula (e-2): $[R^9R^8Si—(O—SiR^8_2)_x—O]_y—Si—[O—(R^8_2SiO)_v SiR^8_3]_w$, where each $R^8$ in this formula (e-2) is an alkyl group of 1 to 6 carbon atoms, or an aryl group of 6 to 10 carbon atoms, and each $R^9$ in this formula (e-2) is an alkenyl group of 2 to 6 carbon atoms; and subscripts v, w, x, and y have values such that $200≥v≥1$, $2≥w≥0$, $200≥x≥1$, $4≥y≥0$, and a quantity (w+y)=4. Alternatively, in this formula (e-2), each $R^8$ is independently selected from the group consisting of methyl and phenyl, and each R9 is independently selected from the group consisting of vinyl, allyl, and hexenyl. Branched polyorganosiloxane suitable for starting material (e) may be prepared by known methods such as heating a mixture comprising a polyorganosilicate resin, and a cyclic polydiorganosiloxane or a linear polydiorganosiloxane, in the presence of a catalyst, such as an acid or phosphazene base, and thereafter neutralizing the catalyst.

Alternatively, starting material (e) may comprise a T branched polyorganosiloxane of unit formula (e-3): $(R^8_3SiO_{1/2})_{gg}(R^9R^8_2SiO_{1/2})_{hh}(R^8_2SiO_{2/2})_{ii}(R^8SiO_{3/2})_{jj}$, where $R^8$ and $R^9$ are as described above, subscript gg≥0, subscript hh>0, subscript ii is 15 to 995, and subscript jj>0. Subscript gg may be 0 to 10. Alternatively, for subscript gg: $12≥gg≥0$; alternatively $10≥gg≥0$; alternatively $7≥gg≥0$; alternatively $5≥gg≥0$; and alternatively $3≥gg≥0$.

Alternatively, subscript hh≥1. Alternatively, subscript hh≥3. Alternatively, for subscript hh: $12≥hh>0$; alternatively $12≥hh≥3$; alternatively $10≥hh>0$; alternatively $7≥hh>1$; alternatively $5≥hh≥2$; and alternatively $7≥hh≥3$. Alternatively, for subscript ii: $800≥ii≥15$; and alternatively $400≥ii≥15$. Alternatively, subscript jj≥1. Alternatively, subscript jj is 1 to 10. Alternatively, for subscript jj: $10≥jj>0$; alternatively $5≥jj>0$; and alternatively jj=1. Alternatively, subscript jj is 1 to 10, alternatively subscript jj is 1 or 2. Alternatively, when subscript jj=1, then subscript hh may be 3 and subscript gg may be 0. The values for subscript hh may be sufficient to provide the silsesquioxane of unit formula (e-3) with an alkenyl content of 0.1% to 1%, alternatively 0.2% to 0.6%, based on the weight of the silsesquioxane. Suitable silsesquioxanes for starting material (e-3) are exemplified by those disclosed in U.S. Pat. No. 4,374,967.

The amount of starting material (e) depends on various factors including the type and amount of starting material (a), the type and amount of starting material (d), the concentration of aliphatically unsaturated groups and silicon bonded hydrogen atoms of the starting materials in the composition, whether a solvent or reactive diluent is present, and whether an inhibitor is present. However, the amount of starting material (e) may be 0% to 40%, alternatively 5% to 40%, alternatively 10% to 35%, alternatively 15% to 30%, alternatively 20% to 65%, and alternatively 25% to 60%, based on combined weights of all starting materials in the silicone pressure sensitive adhesive composition.

(f) Solvent

Starting material (f) is a solvent. Starting material (f) may be an organic solvent such as a hydrocarbon, a ketone, an ester acetate, an ether, a cyclic siloxane having an average degree of polymerization from 3 to 10, and/or a halogenated hydrocarbon. Suitable hydrocarbons for starting material (f) can be i) an aromatic hydrocarbon such as benzene, toluene, or xylene; ii) an aliphatic hydrocarbon such as hexane, heptane, octane, or iso-paraffin; or a combination thereof. Alternatively, starting material (f) may be a glycol ether such as propylene glycol methyl ether, dipropylene glycol methyl ether, propylene glycol n-butyl ether. Suitable ketones include acetone, methyl ethyl ketone, or methyl isobutyl ketone. Suitable ester acetates include ethyl acetate or isobutyl acetate. Suitable ethers include diisopropyl ether or 1,4-dioxane. Suitable cyclic siloxanes having a degree of polymerization from 3 to 10, alternatively 3 to 6, include hexamethylcyclotrisiloxane, octamethylcyclotetrasiloxane, and/or decamethylcyclopentasiloxane. Suitable halogenated hydrocarbons include trichloroethylene; per-chloroethylene; trifluoromethylbenzene; 1,3-bis(trifluoromethyl)benzene; methylpentafluorobenzene; dichloromethane; 1,1,1-trichloroethane; and methylene chloride.

The amount of solvent will depend on various factors including the type of solvent selected and the amount and type of other starting materials selected for the silicone pressure sensitive adhesive composition. However, the amount of solvent may range from 0% to 90%, alternatively 0% to 50%, and alternatively 20% to 60%, based on combined weights of all starting materials in the silicone pressure sensitive adhesive composition. The solvent can be added during preparation of the silicone pressure sensitive adhesive composition, for example, to aid mixing and delivery. All or a portion of the solvent may be added with one of the other starting materials. For example, the polyorganosilicate resin, and polydiorganosiloxane (and the branched polyorganosiloxane, when present), may be dissolved in a solvent, such as an aromatic hydrocarbon, before combination with the other starting materials in the silicone pressure sensitive composition. All or a portion of the solvent may optionally be removed after the silicone pressure sensitive adhesive composition is prepared.

(g) Reactive Diluent

Starting material (g) is an olefinic reactive diluent. The olefinic reactive diluent comprises a hydrocarbon compound of 8 to 18 carbon atoms and at least one aliphatic unsaturation per molecule. The olefinic reactive diluent may be linear. The reactive diluent may be linear or branched. The aliphatic unsaturation may be pendant or terminal. Examples of reactive diluents suitable for starting material (g) include (g-1) n-dodecene; (g-2) n-tetradecene; (g-3) n-hexadecene; (g-4) n-octadecene; (g-5) a branched isomer of any of (g-1), (g-2), (g-3), and/or (g-4); and (g-6) combinations of two or more of (g-1), (g-2), (g-3), (g-4), and/or (g-5). The reactive diluent may have a double bond at a terminal position. Alternatively, starting material (g) may comprise 12 to 14 carbon atoms. Alternatively, starting material (g) may comprise n-tetradecene.

The amount of starting material (g) depends on various factors including the selection and amounts of starting materials (a) and (d) and/or (e) when present. However, the amount of starting material (g) may be 0 to <5%, alternatively 0.5% to <5%, alternatively 1% to 3%, alternatively 1.2% to 3%, alternatively 1.9% to 2.6%, and alternatively 2% to 2.5%, based on combined weights of all starting materials in the silicone pressure sensitive adhesive composition.

(h) Hydrosilylation Reaction Inhibitor

The pressure sensitive adhesive composition may optionally further comprise (h) a hydrosilylation reaction inhibitor. Inhibitors for hydrosilylation reactions are exemplified by (h-1) acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-diemthyl-1-hexyn-3-ol, and 1-ethynyl-1-cyclohexanol, and a combination of two or more thereof; (h-2) cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination of two or more thereof; (h-3) ene-yne compounds such as 3-methyl-3-penten-1-yne, 3,5-dimethyl-3-hexen-1-yne, and a combination of two or more thereof; (h-4) triazoles such as benzotriazole; (h-5) phosphines; (h-6) mercaptans; (h-7) hydrazines; (h-8) amines, such as tetramethyl ethylenediamine; (h-9) fumarates such as dialkyl fumarates, dialkenyl fumarates, dialkoxyalkyl fumarates, and a combination of two or more thereof; (h-10) maleates such as diallyl maleate; (h-11) nitriles; (h-12) ethers; (h-13) carbon monoxide; (h-14) alcohols such as benzyl alcohol; (h-15) a silylated acetylenic compound; and (h-16) a combination of two or more of (h-1) to (h-15).

The silylated acetylenic compound may be used to reduce or minimize coloring (e.g., yellowing) of the pressure sensitive adhesive prepared by curing the pressure sensitive adhesive composition described herein; as compared to a pressure sensitive adhesive that does not contain a silylated acetylenic compound or that contains an organic acetylenic alcohol, such as those described above. The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the inhibitor is exemplified by rnethyl(tris(1,1-dimethyl-2-propynyloxy))silane, ((1,1-dimethyl-2-propynyl)oxy)trimethylsilane, or a combination thereof. The silylated acetylenic compound useful as inhibitor may be prepared by methods known in the art, such as silylating an acetylenic alcohol described above by reacting it with a chlorosilane in the presence of an acid receptor.

The amount of inhibitor will depend on various factors including the desired pot life of the starting materials, the temperature selected for curing the pressure sensitive adhesive composition, the particular inhibitor used, and the selection and amounts other starting materials used. However, when present, the amount of inhibitor may be 0% to 5%, alternatively 0.05% to 1%, alternatively 0.01% to 0.5%, and alternatively 0.0025% to 0.025%, based on combined weights of all starting materials in the pressure sensitive adhesive composition.

Alternatively, the hydrosilylation curable composition may be a silicone pressure sensitive adhesive composition, which may comprise:

(a) 10% to 60% of the polydiorganosiloxane having an average, per molecule, of at least two aliphatically unsaturated hydrocarbon groups, (b) 0.01% to 5% of the polyorganohydrogensiloxane having an average, per molecule, of at least two silicon bonded hydrogen atoms per molecule, (c) 0.01% to 5% of the hydrosilylation reaction catalyst,
5% to 40% of (d) the polysiloxane resin, (e) the branched polyorganosiloxane, or a combination of both (d) and (e), (f) 0 to 50% of the solvent and/or (g) 0 to 5% of the reactive diluent, and (h) 0 to 5% of the hydrosilylation reaction inhibitor.

The pressure sensitive adhesive composition herein may comprise 0.1% to 5% of the anchorage additive described above, and 95% to 99.9% of the silicone pressure sensitive adhesive composition described above. In the pressure sensitive adhesive composition, the starting materials are selected such that upon mixing the starting materials, the pressure sensitive adhesive composition may have a viscosity of 300 mPa·s to 5,000 mPa·s as measured by the rotational viscometry method described in the Reference Examples below. Without wishing to be bound by theory, it is thought that a viscosity less than 300 mPa·s may cause the pressure sensitive adhesive composition to flow on a surface of a backing substrate to which the pressure sensitive adhesive composition is applied before curing, which may result in non-uniform adhesive coverage on substrates and detrimentally affect optical properties of an adhesive surface of the pressure sensitive adhesive prepared by curing the pressure sensitive adhesive composition (e.g., the surface opposite the backing substrate on which the pressure sensitive adhesive composition is applied and cured). Without wishing to be bound by theory, it is thought that if viscosity of the pressure sensitive adhesive composition exceeds 5,000 mPa·s, then the pressure sensitive adhesive composition may not be suitable for use with some coating machines, such as Gravure or Comma.

Method of Making Pressure Sensitive Adhesive Composition

The pressure sensitive adhesive composition can be prepared by a method comprising combining the anchorage additive prepared as described above and all other starting materials of the silicone pressure sensitive adhesive composition as described above by any convenient means such as mixing at ambient or elevated temperature. The hydrosilylation reaction inhibitor may be added before the hydrosilylation reaction catalyst, for example, when the pressure sensitive adhesive composition will be prepared at elevated temperature and/or the pressure sensitive adhesive composition will be prepared as a one part composition.

The method may further comprise delivering one or more starting materials in a solvent (e.g., the hydrosilylation reaction catalyst, and when present, the resin) may be dissolved in a solvent when combined with one or more of the other starting materials in the composition. One skilled in the art would understand that if it is desired that the resulting pressure sensitive adhesive composition will be solventless (i.e., will contain no solvent or may contain trace amounts of residual solvent from delivery of a starting material, however, a solvent e.g., organic solvent such as toluene or non-functional polydiorganosiloxane), then solvent may be removed after mixing two or more of the starting materials, and in this embodiment solvent is not intentionally added to the pressure sensitive adhesive composition.

Alternatively, the pressure sensitive adhesive composition may be prepared as a multiple part composition, for example, when the pressure sensitive adhesive composition will be stored for a long period of time before use, e.g., up to 6 hours before coating the pressure sensitive adhesive composition on a substrate. In the multiple part composition, the hydrosilylation reaction catalyst is stored in a separate part from any starting material having a silicon bonded hydrogen atom, for example the polyorganohydrogensiloxane, and the parts are combined shortly before use of the pressure sensitive adhesive composition.

For example, a multiple part composition may be prepared by combining starting materials comprising at least some of the polydiorganosiloxane having a monovalent hydrocarbon group with terminal aliphatic unsaturation, the polyorganohydrogensiloxane, and optionally one or more other additional starting materials described above to form a base part, by any convenient means such as mixing. A curing agent may be prepared by combining starting materials comprising at least some of the polydiorganosiloxane having a monovalent hydrocarbon group with terminal aliphatic unsaturation, the hydrosilylation reaction catalyst, and optionally one or more other additional starting materials described above by any convenient means such as mixing. The starting materials may be combined at ambient or elevated temperature. The hydrosilylation reaction inhibitor may be included in one or more of the base part, the curing agent part, or a separate additional part. The anchorage additive may be added to the base part, or may be added as a separate additional part. The resin may be added to the base part, the curing agent part, or a separate additional part. The branched polyorganosiloxane may be added to the base part. The solvent or the reactive diluent may be added to the base part. Alternatively, starting materials comprising the branched polyorganosiloxane, and some or all of the solvent and/or the reactive diluent the may be added in a separate additional part. When a two part composition is used, the weight ratio of amounts of base part to curing agent part may range from 1:1 to 10:1. The pressure sensitive adhesive composition will cure via hydrosilylation reaction to form a pressure sensitive adhesive.

The method described above may further comprise one or more additional steps. The pressure sensitive adhesive composition prepared as described above may be used to form an adhesive article, e.g., a pressure sensitive adhesive (prepared by curing the pressure sensitive adhesive composition described above) on a substrate. The method may, therefore, further comprise comprises applying the pressure sensitive adhesive composition to a substrate.

Applying the pressure sensitive adhesive composition to the substrate can be performed by any convenient means. For example, the pressure sensitive adhesive curable composition may be applied onto a substrate by gravure coater, comma coater, offset coater, offset-gravure coater, roller coater, reverse-roller coater, air-knife coater, or curtain coater.

The substrate can be any material that can withstand the curing conditions (described below) used to cure the pressure sensitive adhesive composition to form the pressure sensitive adhesive on the substrate. For example, any substrate that can withstand heat treatment at a temperature equal to or greater than 120° C., alternatively 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polyethylene (PE), or polypropylene (PP). Alternatively, the substrate may be a metal foil such as aluminum foil or copper foil. The thickness of the substrate is not critical, however, the thickness may be 5 micrometers to 300 micrometers.

To improve bonding of the pressure sensitive adhesive to the substrate, the method for forming the adhesive article may optionally further comprise treating the substrate before applying the pressure sensitive adhesive composition. Treating the substrate may be performed by any convenient means, such as applying a primer, or subjecting the substrate to corona-discharge treatment, etching, or plasma treatment before applying the pressure sensitive adhesive composition to the substrate.

An adhesive article such as a film or tape may be prepared by applying the pressure sensitive adhesive curable composition described above onto the substrate described above. When the pressure sensitive adhesive composition contains a solvent, the method may further comprise removing the all, or a portion, of the solvent before and/or during curing. Removing solvent may be performed by any convenient means, such as heating at a temperature that vaporizes the solvent without fully curing the pressure sensitive adhesive composition, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes).

Curing the pressure sensitive adhesive composition may be performed by heating at a temperature of 80° C. to 200° C., alternatively 90° C. to 180° C., alternatively 100° C. to 160° C., and alternatively 110° C. to 150° C. for a time sufficient to cure the pressure sensitive adhesive composition (e.g., for 30 seconds to an hour, alternatively 1 to 5 minutes). If cure speed needs to be increased or the process oven temperatures lowered, the catalyst level can be increased. This forms a pressure sensitive adhesive on the substrate. Curing may be performed by placing the substrate in an oven. The amount of the pressure sensitive adhesive composition to be applied to the substrate depends on the specific application, however, the amount may be sufficient such that after curing thickness of the pressure sensitive adhesive may be 5 micrometers to 100 micrometers, and for protective film the thickness may be 6 micrometers to 50 micrometers, alternatively 8 micrometers to 40 micrometers, and alternatively 10 to 30 micrometers.

The method described herein may optionally further comprise applying a removable release liner to the pressure sensitive adhesive opposite the substrate, e.g., to protect the pressure sensitive adhesive before use of the adhesive article. The release liner may be applied before, during or after curing the pressure sensitive adhesive composition; alternatively after curing.

The adhesive article (e.g., protective film) prepared as described above is suitable for use in electronic device processing. For example, in one embodiment, the adhesive article may be used in electronic device fabrication processes, such as a flexible OLED device fabrication process, as a protective film with low adhesion, removability with low peeling force, high adhesion stability, and/or low migration (no or minimal transfer of pressure sensitive adhesive to the electronic device).

For example, a method for fabricating an electronic device, exemplified by a flexible OLED device, may include forming an OLED module on a surface of a substrate, e.g., a passivation layer on a surface of the OLED module opposite the substrate, and applying a protective film (i.e., an adhesive article comprising the pressure sensitive adhesive prepared as described herein) to a surface of the passivation layer opposite the OLED module. The method further comprises removing the protective film after processing. The protective film may be removed without damaging the electronic device after processing.

In an alternative embodiment, the adhesive article prepared as described above may be used for surface protection of an electronic device, such as screen or other surface protection during shipment of the device, such as a smartphone or tablet, or at an end user for screen protection of such a device. The pressure sensitive adhesive and substrate selected are typically transparent for screen protection applications. The adhesive article may be removed without damaging the electronic device after shipping.

EXAMPLES

These examples are intended to illustrate some embodiments of the invention and should not be interpreted as limiting the scope of the invention set forth in the claims. The starting materials in Table 1 were used in the examples herein.

TABLE 1

| Starting Material | Description | Viscosity (mPa · s) | % vinyl | % SiH | DP |
|---|---|---|---|---|---|
| A-1-3 | vinyltriacetoxysilane | NR | NR | NR | NR |
| A-1-1 | vinyltrimethoxysilane | NR | NR | NR | NR |
| A-1-2 | vinyltriethoxysilane | NR | NR | NR | NR |
| A-2-1 | glycidoxypropyl-trimethoxysilane | NR | NR | NR | NR |
| A-2-2 | epoxycyclohexyl ethyltrimethoxysilane | NR | NR | NR | NR |
| B-1-1 | α,w-hydroxy,dimethyl-siloxy terminated poly(dimethylsiloxane/methylvinylsiloxane) | NR | 12.0 | NR | 6 |
| PSA1 | a mixture of (a-3) α,ω-dimethylvinylsiloxy-terminated polydimethylsiloxane; (b-9) α,ω-trimethylsiloxy-terminated poly(methylhydrogensiloxane) crosslinker; xylene solvent; and maleate inhibitor | NR | 0.012% (in a-3) | 1.6% (in b-9) | 9500 (in a-3) 65(in b-9) |
| PSA2 | a mixture of (a-3) α,ω-dimethylvinylsiloxy-terminated polydimethylsiloxane; branched polymer having unit formula $(Me_2ViSiO_{1/2})\ mm(Me_2SiO_{2/2})\ nn(SiO_{4/2})_1$, where subscript mm is 2 to 4 and subscript nn is 40 to 400; and ethynyl cyclohexanol, where | NR | NR | NR | NR |
| (b-9-1) | α,ω-trimethylsiloxy-terminated polymethylhydrogensiloxane | NR | NR | 1.6% | 65 |
| (c-1-1) | Karstedt's catalyst | NR | NR | NR | NR |
| (f-2-1) | heptane | NR | NR | NR | NR |

In the tables herein, 'N/A' means not applicable, and 'NR' means not reported.

Reference Example—General Procedure for Anchorage Additive Samples

Samples were prepared using the starting materials in Table 1, above, in the weight parts shown in Tables 2 and 3, below. First, (A-1) an unsaturated silane and (A-2) a trialkoxysilane having an anchorage promoting group were combined in a reactor purged with nitrogen. The silanes were heated and mixed at 140° C. for 240 minutes. The resulting mixture was cooled to a temperature below 50° C. Next, (B) a polydiorganosiloxane having hydroxyl and aliphatically unsaturated groups was added to the reactor. The resulting mixture was mixed at a temperature of 0 to 50° C. for 40 minutes. The resulting anchorage additive sample was filtered into a polytetrafluoroethylene container that had been purged with nitrogen for 30 seconds.

TABLE 2

Comparative Anchorage Additive Samples

| | Sample | | | | | | | | | |
|---|---|---|---|---|---|---|---|---|---|---|
| | 1 | 2 | 3 | 4 | 5 | 6 | 7 | 8 | 9 | 10 |
| A-1-1 | 0 | 0 | 0 | 50 | 50 | 0 | 0 | 0 | 0 | 0 |
| A-1-2 | 0 | 0 | 0 | 0 | 0 | 50 | 0 | 0 | 0 | 0 |
| A-1-3 | 50 | 0 | 0 | 0 | 0 | 0 | 33.5 | 12.0 | 21.4 | 20.8 |
| A-2-1 | 50 | 0 | 50 | 0 | 0 | 0 | 33.5 | 12.0 | 50.0 | 48.4 |
| A-2-2 | 0 | 50 | 0 | 0 | 50 | 50 | 33.0 | 0 | 0 | 0 |
| B-1-1 | 0 | 50 | 50 | 50 | 0 | 0 | 0 | 76.0 | 28.6 | 30.8 |
| (A-1)/(A-2) Ratio | 1 | 0 | 0 | N/A | 1 | 1 | 0.5 | 1 | 0.4 | 0.4 |
| % (A) | 100 | 50 | 50 | 50 | 100 | 100 | 100 | 24 | 71 | 69 |
| % (B) | 0 | 50 | 50 | 50 | 0 | 0 | 0 | 76 | 29 | 31 |

TABLE 3

Anchorage Additive Samples

| | Sample | | | | | |
|---|---|---|---|---|---|---|
| | 11 | 12 | 13 | 14 | 15 | 16 |
| A-1-3 | 33.5 | 25.0 | 16.6 | 20.1 | 36.2 | 32.6 |
| A-2-1 | 33.5 | 25.0 | 16.6 | 47.0 | 15.5 | 14.0 |
| B-1-1 | 33.0 | 50.0 | 66.8 | 32.9 | 48.3 | 53.4 |
| (A-1)/(A-2) Ratio | 1 | 1 | 1 | 0.4 | 2.3 | 2.3 |
| % (A) | 67 | 50 | 33 | 67 | 52 | 47 |
| % (B) | 33 | 50 | 67 | 33 | 48 | 53 |

Reference Example 2—General Procedure for Making Pressure Sensitive Adhesive Samples Samples were prepared using the starting materials in Table 1 in the amounts shown in Tables 4 and 5 as follows. First, high adhesion PSA1 and low adhesion PSA2 were blended at mixing ratio of 1:9. Each anchorage additive prepared as described above was then added. Heptane solvent (f-2-1) was then added. The resulting composition was mixed. Crosslinker (b-9-1) was then added with mixing. Karstedt's catalyst (c-1-1) was then added with mixing to prepare pressure sensitive adhesive composition sample. Mixing was performed at RT with exposure to air.

PSA tape samples were then prepared as follows by applying the composition prepared as described above and controlling the thickness at 30±5 micrometers on PET film with thickness at 50±5 micrometers and haze at 3.0±0.2. These samples were cured by placing them in an oven at 150° C. for 2 minutes.

PSA tape samples were prepared for the rub-off test by putting the samples prepared as described above into boiling water for 2 hours, then picking up PET sheets and sweeping the water and keeping them at RT for direct rub-off test (as described below in Reference Example 3).

Samples were prepared for the initial adhesion test (see Reference Example 3) by attaching PET film with cured PSA on glass and keeping samples for 24 hours at RT.

Samples were prepared for the adhesion with aging treatment test (see reference example 3) by attaching a PET film with cured PSA on glass and keeping them in the oven under 70° C. and RH 80% for 3 days, and then keep samples at RT for 30 minutes. Tables 4 and 5 show pressure sensitive adhesive composition ingredients (amounts in weight parts) and test results. The sample number corresponds to the anchorage additive prepared as describe above.

Reference Example 3—Test Methods

Viscosity was measured at RT using rotational viscometry with a Brookfield viscometer DV-II.

Haze of PET film with/without cured PSA by haze meter. A BYK Haze-gard Plus was used to measure the haze. Transparency, Haze, and Clarity were reported.

Rub-Off Resistance (Rub Off) was measured by using a finger to rub off the cured pressure sensitive adhesive on PET film to check the detaching condition for the adhesive layer. In the tables herein, 'Fail' means that the pressure sensitive adhesive could be rubbed off from substrate by using a finger, and 'Pass' means that the PSA could not be rubbed off from substrate by using a finger.

Adhesion was tested by peeling the PSA tape from the glass, and checking if there was any adhesive transferred onto the glass and separated with the PET film with instrument Adhesion/Release Tester AR-1500. The width of PET sheet was 1 inch. Peel speed and angle were 0.3 m/min and 180° respectively.

TABLE 4

Comparative Pressure Sensitive Adhesive Samples

| | Anchorage Additive | | | | | | | | | |
|---|---|---|---|---|---|---|---|---|---|---|
| | 1 | 2 | 3 | 4 | 5 | 6 | 7 | 8 | 9 | 10 |
| PSA1 | 2 | 2 | 2 | 2 | 2 | 2 | 2 | 2 | 2 | 2 |
| PSA2 | 18 | 18 | 18 | 18 | 18 | 18 | 18 | 18 | 18 | 18 |
| (b-9-1) | 0.22 | 0.22 | 0.22 | 0.22 | 0.22 | 0.22 | 0.22 | 0.22 | 0.22 | 0.22 |
| (f-2-1) | 11 | 11 | 11 | 11 | 11 | 11 | 11 | 11 | 11 | 11 |
| (c-1-1) | 0.38 | 0.38 | 0.38 | 0.38 | 0.38 | 0.38 | 0.38 | 0.38 | 0.38 | 0.38 |
| Amount of Anchorage Additive | 0.2 | 0.2 | 0.2 | 0.2 | 0.2 | 0.2 | 0.2 | 0.2 | 0.4 | 0.4 |
| Haze | 7.4 | 3.02 | 2.94 | 2.7 | 2.84 | 2.67 | 3.67 | 3.41 | 4.55 | 4.33 |
| Rub Off | pass | fail | fail | fail | fail | fail | fail | fail | pass | pass |
| Adhesion to Glass | 3.5 | NR | NR | NR | NR | NR | 3.5 | 3.4 | fail (11.1) | fail (23.3) |
| Adhesion after Aging | 10.5 | NR | NR | NR | NR | NR | 21.0 | fail | fail (14.5) | fail |

TABLE 5

Pressure Sensitive Adhesive Samples

| Anchorage | Anchorage Additive | | | | | |
|---|---|---|---|---|---|---|
| | 11 | 12 | 13 | 14 | 15 | 16 |
| PSA1 | 2 | 2 | 2 | 2 | 2 | 2 |
| PSA2 | 18 | 18 | 18 | 18 | 18 | 18 |
| (b-9-1) | 0.22 | 0.22 | 0.22 | 0.22 | 0.22 | 0.22 |
| (f-2-1) | 11 | 11 | 11 | 11 | 11 | 11 |
| (c-1-1) | 0.38 | 0.38 | 0.38 | 0.38 | 0.38 | 0.38 |
| Amount of Anchorage Additive | 0.2 | 0.2 | 0.2 | 0.3 | 0.4 | 0.4 |
| Haze | 3.58 | 4.3 | 5.07 | 3.44 | 3.57 | 3.53 |
| Rub Off | pass | pass | pass | pass | pass | pass |
| Adhesion to Glass | 3.4 | 3.4 | 3.1 | 4.4 | 4.0 | 4.2 |
| Adhesion after Aging | 10.4 | 6.3 | 6.8 | 7.2 | 7.0 | 7.3 |

INDUSTRIAL APPLICABILITY

The adhesive article prepared as described above is useful in electronics applications, such protection as a masking tape, carrier tape, or other protective film. The pressure sensitive adhesive used to prepare the adhesive article has low haze (good optical transparency), good rub off resistance, good adhesion to glass, and good adhesion after aging (adhesion does not increase to an undesirable degree after aging) when evaluated by the test methods in Reference Example 3, above. In certain protection applications, it may be desirable for the pressure sensitive adhesive in the adhesive article to have low release force (e.g., adhesion of 15 g/inch or less to certain substrates). The pressure sensitive adhesive made by the composition and method described herein may have adhesion (as measured by peel force described in Reference Example 2) of 0.5 g/inch to 400 g/inch, alternatively 0.5 g/inch to 200 g/inch, for carrier tape applications. Alternatively, the pressure sensitive adhesive may have peel force of 0.5 g/inch to 15 g/inch for protective film applications.

The pressure sensitive adhesive composition used to prepare the pressure sensitive adhesive in the adhesive article described herein may have a viscosity of 300 mPa·s to 5,000 mPa·s, alternatively 300 mPa·s to 4,000 mPa·s, alternatively 500 mPa·s to 3,000 mPa·s, and alternatively 500 mPa·s to 2,500 mPa·s, as measured by the rotational viscometry technique described in Reference Example 2. Without wishing to be bound by theory, it is thought that when the adhesive article will be used in a protective film application, a low coating thickness (e.g., of 5 micrometers to 15 micrometers on a backing substrate) can be facilitated by viscosities in these ranges to ensure processability with conventional coating equipment and processes.

Furthermore, good optical properties (optical clarity) are desirable for certain protective film applications (e.g., screen protection). An adhesive article including a transparent backing substrate (such as PI or PET) and a low coating thickness e.g., of 5 micrometers to 15 micrometers) of a pressure sensitive adhesive with good coating appearance and low haze as measured by the techniques in Reference Example 3.

Definitions and Usage of Terms

Abbreviations used in the specification have the definitions in Table 6, below.

TABLE 6

| Abbreviations | |
|---|---|
| Abbreviation | Definition |
| cP | centiPose |
| d | day |
| Da | Daltons |
| DP | degree of polymerization |
| FTIR | Fourier Transfer Infra-Red |
| GC | gas chromatography |
| GPC | gel permeation chromatography |
| Me | methyl |
| Mn | number average molecular weight |
| mPa · s | milli-Pascal seconds |
| NMR | nuclear magnetic resonance |
| Ph | phenyl |
| ppm | parts per million |
| RH | relative humidity |
| RT | room temperature of 25° C. |
| Vi | vinyl |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means a branched or unbranched, saturated monovalent hydrocarbon group. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neopentyl, and/or tert-pentyl); and hexyl, heptyl, octyl, nonyl, and decyl, as well as branched saturated monovalent hydrocarbon groups of 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, phenylethyl, phenyl propyl, and phenyl butyl. Aralkyl groups have at least 7 carbon atoms. Monocyclic aralkyl groups may have 7 to 12 carbon atoms, alternatively 7 to 9 carbon atoms, and alternatively 7 to 8 carbon atoms. Polycyclic aralkyl groups may have 7 to 17 carbon atoms, alternatively 7 to 14 carbon atoms, and alternatively 9 to 10 carbon atoms.

"Alkenyl" means a branched, or unbranched monovalent hydrocarbon group, where the monovalent hydrocarbon group has a double bond. Alkenyl groups include vinyl, allyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Monovalent hydrocarbon group" means a univalent group made up of hydrogen and carbon atoms. Monovalent hydrocarbon groups include alkyl, aralkyl, alkenyl, alkynyl, and cycloalkyl groups as defined above.

"Monovalent halogenated hydrocarbon group" means a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups and fluorinated cycloalkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl and chlorinated cycloalkyl groups such as chloromethyl, 3-chloropropyl 2,2-dichlorocyclopropyl, 2,3-dichlorocyclopentyl. Haloalkenyl groups include chloroallyl.

The term "comprising" and derivatives thereof, such as "comprise" and "comprises" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims and embodiments of the invention are not limited to express and particular compounds, compositions, or methods described in the detailed description, which may vary between particular embodiments which fall within the scope of the appended claims and embodiments of the invention.

Embodiments of the Invention

In a first embodiment, a pressure sensitive adhesive composition comprises:
(I) an anchorage additive prepared by a process comprising
1) combining, at a temperature of −20° C. to 160° C., starting materials (A) and (B), where starting material (A) is 33% to 67% of a silane composition comprising
(A-1) an unsaturated silane of formula $R^1SiR^2_3$, where $R^1$ is a monovalent hydrocarbon group with aliphatic unsaturation, each $R^2$ is independently selected from the group consisting of a hydrocarbonoxy group and an acyloxy group;
(A-2) a trialkoxysilane having an anchorage promoting-group, where the trialkoxysilane has formula $R^3Si(OR^4)_3$, where each $R^3$ comprises an anchorage promoting-group selected from the group consisting of an epoxy-functional group, an acyloxy-functional group, and an acrylate-functional group, and each $R^4$ is an independently selected alkyl group of 1 to 6 carbon atoms;
with the proviso that (A-1) and (A-2) are used in amounts such that a weight ratio of (A-1)/(A-2) has a value of 0.4/1 to 2.5/1; and
starting material (B) is 33% to 67% of a polydiorganosiloxane having unit formula (B-1): $(R^7R^5_cR^6_{(2-c)}SiO_{1/2})_2(R^5_2SiO_{2/2})_a(R^5R^6SiO_{2/2})_b$, where each $R^7$ is independently selected from the group consisting of OH and $OR^4$, each $R^5$ is independently selected from the group consisting of monovalent hydrocarbon groups free of aliphatic unsaturation and monovalent halogenated hydrocarbyl groups free of aliphatic unsaturation, each $R^6$ is an independently selected monovalent hydrocarbon group with aliphatic unsaturation, subscript a≥0, and subscript b≥0, and subscript c has a value such that 2≥c≥1, where combined amounts of starting materials (A) and (B) add up to 100%; and
(II) a silicone pressure sensitive adhesive composition.

In a second embodiment, in starting material (A-1) each $R^1$ is alkenyl, and each $R^2$ is alkoxy or acetoxy.

In a third embodiment, in starting material (A-2) each $R^2$ is methyl or ethyl, and each $R^3$ is selected from the group consisting of glycidoxyalkyl or epoxycyclohexylalkyl.

In a fourth embodiment, in starting material (B), each $R^7$ is independently selected from the group consisting of OH and $OCH_3$, each $R^5$ is selected from the group consisting of methyl and ethyl, and each $R^6$ is independently selected from the group consisting of vinyl, allyl, and hexenyl.

In a fifth embodiment, starting material (B) comprises a polydiorganosiloxane with both a hydrolyzable group and a monovalent hydrocarbon group with aliphatic unsaturation and starting material (B) further comprises up to 20% of a polydiorganosiloxane of unit formula (B-2): $(R^7R^5_2SiO_{1/2})_2(R^5_2SiO_{2/2})_d$, where $R^5$ and $R^7$ are as described above, and subscript $d \geq 1$.

In a sixth embodiment, the silicone pressure sensitive adhesive composition comprises: (a) 10% to 60% of the polydiorganosiloxane with a monovalent hydrocarbon group with aliphatic unsaturation, (b) 0.01% to 5% of the polyorganohydrogensiloxane, (c) 0.01% to 5% of the hydrosilylation reaction catalyst, (d) 5% to 40% of the polyorganosilicate resin, (f) 0 to 50% of the solvent, and (h) 0 to 5% of the hydrosilylation reaction inhibitor, where each of said starting material is described above.

In a seventh embodiment, the pressure sensitive adhesive composition is prepared as a multiple part composition.

In an eighth embodiment, a method for preparing an adhesive article comprises:
1) combining starting materials to form a pressure sensitive adhesive composition, where the starting materials comprise
  (I) an anchorage additive prepared by a process comprising
    1) combining, at a temperature of −20° C. to 160° C., starting materials (A) and (B), where starting material (A) is 33% to 67% of a silane composition comprising
      (A-1) an unsaturated silane of formula $R^1SiR^2_3$, where $R^1$ is a monovalent hydrocarbon group with aliphatic unsaturation, each $R^2$ is independently selected from the group consisting of a hydrocarbonoxy group and an acyloxy group;
      (A-2) a trialkoxysilane having an anchorage promoting-group, where the trialkoxysilane has formula $R^3Si(OR^4)_3$, where each $R^3$ comprises an anchorage promoting-group selected from the group consisting of an epoxy-functional group, an acyloxy-functional group, and an acrylate-functional group, and each $R^4$ is an independently selected alkyl group of 1 to 6 carbon atoms; with the proviso that (A-1) and (A-2) are used in amounts such that a weight ratio of (A-1)/(A-2) has a value of 0.4/1 to 2.5/1; and
    starting material (B) is 33% to 67% of a polydiorganosiloxane having unit formula (B-1): $(R^7R^5_cR^6_{(2-c)}SiO_{1/2})_2$ $(R^5_2SiO_{2/2})_a(R^5R^6SiO_{2/2})_b$, where each $R^7$ is independently selected from the group consisting of OH and $OR^4$, each $R^5$ is independently selected from the group consisting of monovalent hydrocarbon groups free of aliphatic unsaturation and monovalent halogenated hydrocarbyl groups free of aliphatic unsaturation, each $R^6$ is an independently selected monovalent hydrocarbon group with aliphatic unsaturation, subscript $a \geq 0$, and subscript $b \geq 0$, and subscript c has a value such that $2 \geq c \geq 1$, where combined amounts of starting materials (A) and (B) add up to 100%; and
  (II) a silicone pressure sensitive adhesive composition;
2) coating the pressure sensitive adhesive composition on a surface of a backing substrate, and 3) curing the pressure sensitive adhesive composition to form a pressure sensitive adhesive on the surface of the backing substrate.

In a ninth embodiment, the method further comprises treating the backing substrate before coating the composition on the surface.

In a tenth embodiment, the method further comprises: 4) adhering the pressure sensitive adhesive to an electronic device such that the pressure sensitive adhesive is between the backing substrate and the a surface of the electronic device.

In an eleventh embodiment, a method comprises: adhering an adhesive article prepared by the method of any one of the eleventh to thirteenth embodiments to an electronic device during fabrication, performing processing steps on the electronic device, and thereafter removing the adhesive article from the electronic device.

In a twelfth embodiment, a method comprises adhering an adhesive article prepared by the method of any one of the eleventh to thirteenth embodiments to an electronic device after fabrication and before shipping or end use of the device.

In a thirteenth embodiment, the adhesive article is optically transparent and the method further comprises using the adhesive article prepared by the method of any one of the eleventh to thirteenth embodiments for screen protection of an electronic device.

What is claimed is:

1. A process for making an anchorage additive comprising:
  1) combining starting materials (A) and (B), where Starting material (A) is 33% to 67% of a silane composition comprising
    (A-1) an unsaturated silane of formula $R^1SiR^2_3$, where $R^1$ is a monovalent hydrocarbon group with aliphatic unsaturation, each $R^2$ is independently selected from the group consisting of a hydrocarbonoxy group and an acyloxy group;
    (A-2) a trialkoxysilane having an anchorage promoting-group, where the trialkoxysilane has formula $R^3Si(OR^4)_3$, where each $R^3$ comprises an anchorage promoting-group selected from the group consisting of an epoxy-functional group, an acyloxy-functional group, and an acrylate-functional group, and each $R^4$ is an independently selected alkyl group of 1 to 6 carbon atoms;
    with the proviso that (A-1) and (A-2) are used in amounts such that a weight ratio of (A-1)/(A-2) has a value of 0.4/1 to 2.5/1; and
    where starting materials (A-1) and (A-2) are combined at a temperature of >50° C. to 160° C. to form staring material (A), starting material (A) is cooled, and thereafter, starting materials (A) and (B) are combined at a temperature of −20° C. to 50° C.; and
  starting material (B) is 33% to 67% of a polydiorganosiloxane having unit formula: $(R^7R^5_cR^6_{(2-c)}SiO_{1/2})_2$ $(R^5_2SiO_{2/2})_a(R^5R^6SiO_{2/2})_b$, where each $R^7$ is independently selected from the group consisting of OH and $OR^4$, each $R^5$ is independently selected from the group consisting of monovalent hydrocarbon groups free of aliphatic unsaturation and monovalent halogenated hydrocarbyl groups free of aliphatic unsaturation, each $R^6$ is an independently selected monovalent hydrocarbon group with aliphatic unsaturation, subscript $a \geq 0$, and subscript $b \geq 0$, and subscript c has a value such that $2 \geq c \geq 1$, where combined amounts of starting materials (A) and (B) add up to 100%.

2. The process of claim 1, where in starting material (A-1) each $R^1$ is alkenyl, and each $R^2$ is alkoxy or acetoxy.

3. The process of claim 2, where (A-1) is vinyltriacetoxysilane.

4. The process of claim 1, where in starting material (A-2) each $R^4$ is methyl or ethyl, and each $R^3$ is selected from the group consisting of glycidoxyalkyl or epoxycyclohexylalkyl.

5. The process of claim 4, where (A-2) is glycidoxypropyltrimethoxysilane.

6. The process of claim 1, where in starting material (B), each $R^7$ is independently selected from the group consisting of OH and $OCH_3$, each $R^5$ is selected from the group consisting of methyl and ethyl, and each $R^6$ is independently selected from the group consisting of vinyl, allyl, and hexenyl.

7. The process of claim 6, where (B) is an α,ω-hydroxy, dimethylsiloxy-terminated poly(dimethylsiloxane/methylvinylsiloxane).

8. The process of claim 1, where in starting material (A-1) each $R^2$ is acyloxy.

9. An anchorage additive prepared by the process of claim 1.

10. A pressure sensitive adhesive composition comprising:
(I) 0.1% to 5% of the anchorage additive of claim 9, and
(II) 95% to 99.9% of a silicone pressure sensitive adhesive composition.

11. The pressure sensitive adhesive composition of claim 10, where the silicone pressure sensitive adhesive composition comprises:
10% to 60% of a polydiorganosiloxane having a monovalent hydrocarbon group with aliphatic unsaturation;
5% to 40% of a polyorganosilicate resin, a branched polyorganosiloxane, or a combination thereof;
0.01% to 5% of a polyorganohydrogensiloxane; and
0.01% to 5% of a hydrosilylation reaction catalyst.

12. The pressure sensitive adhesive composition of claim 11, where the pressure sensitive adhesive composition further comprises one or more of a solvent, a reactive diluent, and a hydrosilylation reaction inhibitor.

13. A method for preparing an adhesive article comprising:
1) adding to a silicone pressure sensitive adhesive composition, 0.1% to 5% of the anchorage additive of claim 9,
2) coating the pressure sensitive adhesive composition on a substrate, and
3) curing the pressure sensitive adhesive composition.

14. A method for preparing an adhesive article comprising:
1) combining starting materials to form a pressure sensitive adhesive composition, where the starting materials comprise
(I) an anchorage additive prepared by a process comprising
1) combining, at a temperature of −20° C. to 160° C., starting materials (A) and (B), where starting material (A) is 33% to 67% of a silane composition comprising
(A-1) an unsaturated silane of formula $R^1SiR^2_3$, where $R^1$ is a monovalent hydrocarbon group with aliphatic unsaturation, each $R^2$ is independently selected from the group consisting of a hydrocarbonoxy group and an acyloxy group;
(A-2) a trialkoxysilane having an anchorage promoting-group, where the trialkoxysilane has formula $R^3Si(OR^4)_3$, where each $R^3$ comprises an anchorage promoting-group selected from the group consisting of an epoxy-functional group, an acyloxy-functional group, and an acrylate-functional group, and each $R^4$ is an independently selected alkyl group of 1 to 6 carbon atoms;
with the proviso that (A-1) and (A-2) are used in amounts such that a weight ratio of (A-1)/(A-2) has a value of 0.4/1 to 2.5/1; and
starting material (B) is 33% to 67% of a polydiorganosiloxane having unit formula (B-1): $(R^7R^5_cR^6_{(2-c)}SiO_{1/2})_2(R^5_2SiO_{2/2})_a(R^5R^6SiO_{2/2})_b$, where each $R^7$ is independently selected from the group consisting of OH and $OR^4$, each $R^5$ is independently selected from the group consisting of monovalent hydrocarbon groups free of aliphatic unsaturation and monovalent halogenated hydrocarbyl groups free of aliphatic unsaturation, each $R^6$ is an independently selected monovalent hydrocarbon group with aliphatic unsaturation, subscript a≥0, and subscript b≥0, and subscript c has a value such that 2≥c≥1, where combined amounts of starting materials (A) and (B) add up to 100%; and
(II) a silicone pressure sensitive adhesive composition;
2) coating the pressure sensitive adhesive composition on a surface of a backing substrate, and
3) curing the pressure sensitive adhesive composition to form a pressure sensitive adhesive on the surface of the backing substrate.

15. The method of claim 14, which further comprises treating the backing substrate before coating the composition on the surface.

16. A method for adhering an adhesive article to an electronic device, the method comprising:
1) combining starting materials to form a pressure sensitive adhesive composition, where the starting materials comprise
(I) an anchorage additive prepared by a process comprising
1) combining, at a temperature of −20° C. to 160° C., starting materials (A) and (B), where starting material (A) is 33% to 67% of a silane composition comprising
(A-1) an unsaturated silane of formula $R^1SiR^2_3$, where $R^1$ is a monovalent hydrocarbon group with aliphatic unsaturation, each $R^2$ is independently selected from the group consisting of a hydrocarbonoxy group and an acyloxy group;
(A-2) a trialkoxysilane having an anchorage promoting-group, where the trialkoxysilane has formula $R^3Si(OR^4)_3$, where each $R^3$ comprises an anchorage promoting-group selected from the group consisting of an epoxy-functional group, an acyloxy-functional group, and an acrylate-functional group, and each $R^4$ is an independently selected alkyl group of 1 to 6 carbon atoms;
with the proviso that (A-1) and (A-2) are used in amounts such that a weight ratio of (A-1)/(A-2) has a value of 0.4/1 to 2.5/1; and
starting material (B) is 33% to 67% of a polydiorganosiloxane having unit formula (B-1): $(R^7R^5_cR^6_{(2-c)}SiO_{1/2})_2(R^5_2SiO_{2/2})_a(R^5R^6SiO_{2/2})_b$, where each $R^7$ is independently selected from the group consisting of OH and $OR^4$, each $R^5$ is independently selected from the group consisting of monovalent hydrocarbon groups free of aliphatic unsaturation and monovalent halogenated hydrocarbyl groups free of aliphatic unsaturation, each $R^6$ is an independently selected monovalent hydrocarbon group with aliphatic unsaturation, subscript a≥0, and subscript b≥0, and subscript c has a value such that 2≥c≥1, where combined amounts of starting materials (A) and (B) add up to 100%; and (II) a silicone pressure sensitive adhesive composition;

2) coating the pressure sensitive adhesive composition on a surface of a backing substrate, and 3) curing the pressure sensitive adhesive composition to form a pressure sensitive adhesive on the surface of the backing substrate, thereby forming an adhesive article; and 4) adhering the pressure sensitive adhesive to an electronic device such that the pressure sensitive adhesive is between the backing substrate and the a surface of the electronic device.

17. The method of claim 16, where step 4) is performed during fabrication of the electronic device, and the method further comprises performing processing steps on the electronic device, and thereafter removing the adhesive article from the electronic device.

18. The method of claim 16, where step 4) is performed after fabrication of the electronic device and before shipping or end use of the electronic device.

19. The method of claim 18, where the adhesive article is used for screen protection of the electronic device.

* * * * *